(12) United States Patent
Ni et al.

(10) Patent No.: US 11,928,141 B1
(45) Date of Patent: Mar. 12, 2024

(54) METHOD, ELECTRONIC DEVICE, AND COMPUTER PROGRAM PRODUCT FOR RETRIEVING SERVICE REQUEST

(71) Applicant: Dell Products L.P., Round Rock, TX (US)

(72) Inventors: Jiacheng Ni, Shanghai (CN); Zijia Wang, WeiFang (CN); Jinpeng Liu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/071,247

(22) Filed: Nov. 29, 2022

(30) Foreign Application Priority Data

Oct. 20, 2022 (CN) .......................... 202211288599.4

(51) Int. Cl.
    *G06F 16/33*     (2019.01)
    *G06F 16/35*     (2019.01)

(52) U.S. Cl.
    CPC .......... *G06F 16/334* (2019.01); *G06F 16/35* (2019.01)

(58) Field of Classification Search
    CPC .......... G06N 20/00; G06N 5/022; G06N 3/08; G06F 18/22; G06F 16/3347; G06F 40/30;
(Continued)

(56) References Cited

U.S. PATENT DOCUMENTS 9,245,232 B1    1/2016    Trautmann et al.
10,019,716 B1    7/2018    Ainslie et al.
(Continued)

FOREIGN PATENT DOCUMENTS

CN    110363556 A    10/2019
CN    112053703 A    12/2020
(Continued)

OTHER PUBLICATIONS

J. Devlin et al., "BERT: Pre-training of Deep Bidirectional Transformers for Language Understanding," arXiv:1810.04805v2, May 24, 2019, 16 pages.

(Continued)

*Primary Examiner* — Hau H Hoang
(74) *Attorney, Agent, or Firm* — Ryan, Mason & Lewis, LLP (57) ABSTRACT

Embodiments of the present disclosure relate to a method, an electronic device, and a computer program product for retrieving service requests. The method includes determining a hash value of a service request based on the service request. The method further includes determining request pairs based on correlations between the hash value of the service request and a plurality of hash values of a plurality of historical service requests. The method further includes determining a semantic correlation between the service request and the historical service request in each of the plurality of request pairs. The method further includes determining, based on the determined semantic correlation between each request pair, a probability indicating that the service request and the historical service request in the request pair use the same solution. The method further includes determining a retrieved historical service request based on the probability.

20 Claims, 8 Drawing Sheets

(58) Field of Classification Search
CPC .............. G06F 16/285; G06F 16/9014; G06F 16/2255; G06F 18/213; G06F 16/35; G06F 16/56; G06F 16/325; G06F 16/137; G06F 18/23; G06F 21/602; G06F 21/64; G06F 16/248; G06F 16/9538

See application file for complete search history.

(56) References Cited

U.S. PATENT DOCUMENTS

| | | |
|---|---|---|
| 10,410,219 B1 | 9/2019 | El-Nakib |
| 11,004,005 B1 | 5/2021 | Sirois |
| 11,388,244 B1 | 7/2022 | Ni et al. |
| 11,521,087 B2 | 12/2022 | Ni et al. |
| 2018/0253735 A1 | 9/2018 | Bedoun et al. |
| 2019/0034937 A1 | 1/2019 | Zhang et al. |
| 2019/0286486 A1 | 9/2019 | Ma et al. |
| 2020/0089652 A1* | 3/2020 | Jayaraman ............. G06N 20/00 |
| 2020/0136928 A1* | 4/2020 | Sethi ...................... G06N 20/00 |
| 2020/0241861 A1 | 7/2020 | Zhang et al. |
| 2021/0142212 A1 | 5/2021 | Li et al. |
| 2021/0406730 A1 | 12/2021 | Ni et al. |

FOREIGN PATENT DOCUMENTS

| | | |
|---|---|---|
| CN | 108958939 B | 12/2021 |
| CN | 113868368 A | 12/2021 |

OTHER PUBLICATIONS

A. Vaswani et al., "Attention Is All You Need," arXiv:1706.03762v5, 31st Conference on Neural Information Processing Systems, Dec. 6, 2017, 15 pages.

G. Neubig, "Neural Machine Translation and Sequence-to-sequence Models: A Tutorial," arXiv:1703.01619v1, Mar. 5, 2017, 65 pages.

S. Mani et al., "DeepTriage: Exploring the Effectiveness of Deep Learning for Bug Triaging," arXiv:1801.01275v1, Jan. 4, 2018, 11 pages.

T. Mikolov et al., "Efficient Estimation of Word Representations in Vector Space," arXiv:1301.3781v3, Sep. 7, 2013, 12 pages.

G. S. Manku et al., "Detecting Near-Duplicates for Web Crawling," Proceedings of the 16th International Conference on World Wide Web. May 8-12, 2007, 9 pages.

U.S. Appl. No. 17/990,885 filed in the name of Jiacheng Ni et al. filed Nov. 21, 2022, and entitled "Method, Device, and Computer Program Product for Fault Diagnosis."

* cited by examiner

METHOD, ELECTRONIC DEVICE, AND COMPUTER PROGRAM PRODUCT FOR RETRIEVING SERVICE REQUEST

RELATED APPLICATION

The present application claims priority to Chinese Patent Application No. 202211288599.4, filed Oct. 20, 2022, and entitled "Method, Electronic Device, and Computer Program Product for Retrieving Service Request," which is incorporated by reference herein in its entirety.

FIELD

Embodiments of the present disclosure relate to the field of computers, and more particularly, to a method, an electronic device, and a computer program product for retrieving service requests.

BACKGROUND

Among companies that provide large-scale and complex information services, a technical support engineer team will process a large number of service requests from customers, involving problem reports caused by software defects, hardware or network problems, or operational errors. For a given service request, how to find similar cases from service requests that have been solved is a beneficial task in a classifying process of service requests.

In a customer service system of an information service provider, a customer can submit service requests (e.g., including titles, abstracts, and detailed descriptions) for problems encountered while using the corresponding information service, illustratively by means of a customer service request tracking and solving module. Therefore, service request classification can be converted into a text classification problem.

SUMMARY

Embodiments of the present disclosure provide a method, an electronic device, and a computer program product for retrieving service requests.

According to a first aspect of the present disclosure, a method for retrieving service requests is provided. The method includes determining, based on an acquired service request, a hash value of the service request. The method further includes determining a plurality of request pairs based on a plurality of correlations between the hash value of the service request and a plurality of hash values of a plurality of historical service requests, wherein each of the plurality of request pairs includes the service request and one historical service request. The method further includes determining a semantic correlation between the service request and the one historical service request in each of the plurality of request pairs. The method further includes determining, based on the determined semantic correlation of each request pair, a probability indicating that the service request and the historical service request in the request pair use the same solution. The method further includes determining a retrieved historical service request based on the probability.

According to a second aspect of the present disclosure, an electronic device is further provided. The electronic device includes a processor and a memory coupled to the processor, wherein the memory has instructions stored therein, and the instructions, when executed by the processor, cause the electronic device to execute actions. The actions include determining, based on an acquired service request, a hash value of the service request. The actions further include determining a plurality of request pairs based on a plurality of correlations between the hash value of the service request and a plurality of hash values of a plurality of historical service requests, wherein each of the plurality of request pairs includes the service request and one historical service request. The actions further include determining a semantic correlation between the service request and the one historical service request in each of the plurality of request pairs. The actions further include determining, based on the determined semantic correlation of each request pair, a probability indicating that the service request and the historical service request in the request pair use the same solution. The actions further include determining a retrieved historical service request based on the probability.

According to a third aspect of the present disclosure, a computer program product is provided, wherein the computer program product is tangibly stored on a non-transitory computer-readable medium and includes computer-executable instructions, and the computer-executable instructions, when executed by a device, cause the device to execute the method according to the first aspect.

This Summary is provided to introduce the selection of concepts in a simplified form, which will be further described in the Detailed Description below. The Summary is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

In all the accompanying drawings, identical or similar reference numerals indicate identical or similar elements.

DETAILED DESCRIPTION

Embodiments of the present disclosure will be described in more detail below with reference to the accompanying drawings. Although the accompanying drawings show some embodiments of the present disclosure, it should be understood that the present disclosure can be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of the embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below. In addition, all specific numerical values herein are examples, which are provided only to aid in understanding, and are not intended to limit the scope.

For information service providers, a service request tracking and solving system is particularly important, because customers' user experience will be affected by service request repairing and solving efficiency. In conventional technologies, there is a knowledge base from which service requests and corresponding solutions can be retrieved. However, in most technical support teams, team members have different levels of experience, and junior engineers are less efficient than senior engineers. In order to improve work efficiency and customer satisfaction, it is necessary to intelligently and automatically recommend solutions for service requests to engineers.

In order to overcome the above defects, some embodiments of the present disclosure score the similarities of solved service requests of submitted service requests by constructing a retrieval strategy and then recommend solved service requests with high similarity scores to supporting engineers, thereby promoting a classification process of customer service requests, so that the work efficiency is improved through case processing.

In the present disclosure, a method is provided, which expresses classification of service requests as a similarity learning problem. The present disclosure also provides a retrieval strategy, in which two-step similarity modeling is realized. For a given service request, similar solved service requests are found first by using hash correlations as a metric, and request pairs are constructed. Each request pair has a similar historical service request, which may correspond to the same solution. A service request representing model is constructed in the second step, where the model predicts a probability of whether one request pair may be solved by means of the same solution based on a semantic similarity. Therefore, a better retrieval result can be screened out by means of the hash correlation and the semantic correlation, and the retrieval efficiency is improved since the required computing overhead and time are reduced.

Figure 1:
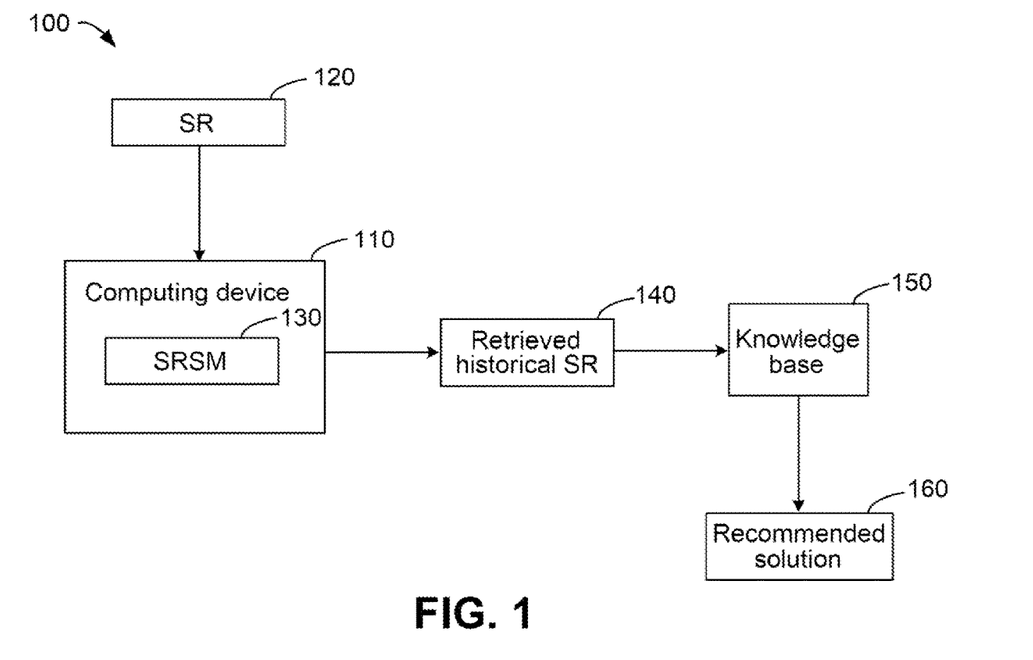
FIG. 1 shows a schematic diagram of an example environment in which embodiments of the present disclosure may be implemented.

FIG. 1 illustrates a schematic diagram of example environment 100 in which embodiments of the present disclosure can be implemented. As shown in FIG. 1, example environment 100 may include computing device 110. Computing device 110 may be, for example, a computing system or a server. Computing device 110 may receive service request (SR) 120 from a customer. SR 120 generally involves problem reports caused by software defects, hardware or network problems, or operational errors. Service request similarity model (SRSM) 130 for retrieving service requests provided by the present disclosure runs on the computing device 110. Retrieved historical SR 140 may be determined by utilizing SRSM 130.

Example environment 100 may include knowledge base 150. Generally, the knowledge base may be exterior to computing device 110 or interior to computing device 110, although the latter arrangement is not shown in the figure. In order to improve the work efficiency and provide some knowledge for junior engineers, some senior and skillful engineers usually summarize processes for repairing and solving common problems and record these processes as a knowledge base. After the problems reported by the service requests are repaired and solved, a knowledge base suitable for solving the service requests should be attached in or otherwise associated with a customer service request, so as to record reference knowledge for solving the service requests. Based on retrieved historical SR 140, knowledge base 150 may be searched and recommended solution 160 may be obtained.

It should be understood that the architecture and functions of example environment 100 are described for illustrative purposes only, without implying any limitation to the scope of the present disclosure. Embodiments of the present disclosure may also be applied to other environments having different structures and/or functions.

A process according to embodiments of the present disclosure will be described in detail below with reference to FIG. 2 to FIG. 9. For ease of understanding, specific data mentioned in the following description is illustrative and is not intended to limit the protection scope of the present disclosure. It should be understood that embodiments described below may also include additional actions not shown and/or may omit actions shown, and the scope of the present disclosure is not limited in this regard.

Figure 2:
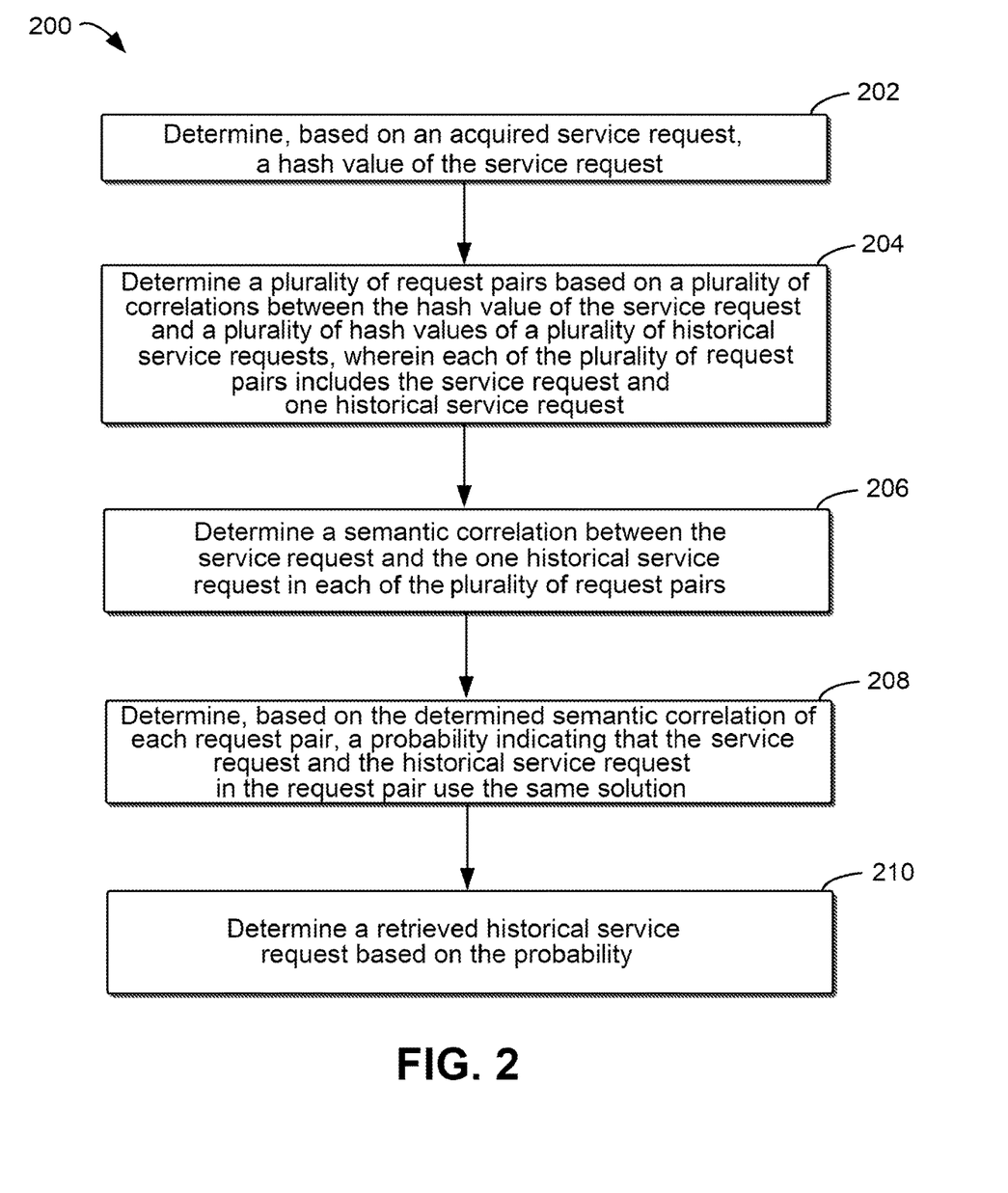
FIG. 2 shows a flow chart of a method for retrieving service requests according to an example implementation of the present disclosure.

FIG. 2 shows a flow chart of a method 200 for retrieving service requests according to an example implementation of the present disclosure. At block 202, based on an acquired service request, a hash value of the service request is determined. As an example, a hash value of SR 120 is determined based on SR 120. An example implementation of determining the hash value will be independently described below with reference to FIG. 3.

At block 204, a plurality of request pairs are determined based on a plurality of correlations between the hash value of the service request and a plurality of hash values of a plurality of historical service requests, wherein each of the plurality of request pairs includes the service request and one historical service request. As an example, it is assumed that there are three historical requests, namely, SR 121, SR 122, and SR 123 respectively, wherein the correlations of SR 121 and SR 122 meet a correlation threshold value, and then SR 120 and SR 121 may constitute request pair 1, and SR 120 and SR 122 may constitute another request pair, request pair 2. SR 123 fails to meet the correlation threshold value, so it is not paired with SR 120. It can be understood that the present disclosure does not limit the number of request pairs.

In some embodiments, all historical SRs may be clustered first, for example, clustered to three clusters. Which cluster the acquired SR belongs to is determined (e.g., meeting a threshold value for belonging to this cluster), and then a plurality of correlations of the plurality of historical SRs are determined in the cluster. Therefore, computing overhead can be reduced, and efficiency can be improved.

At block 206, a semantic correlation between the service request and the one historical service request in each of the plurality of request pairs is determined. As an example, semantic correlation 1 between SR 120 and SR 121 in request pair 1 may be determined, and semantic correlation 2 between SR 120 and SR 122 in request pair 2 may be determined.

At block 208, based on the determined semantic correlation of each request pair, a probability indicating that the service request and the historical service request in the request pair use the same solution is determined. As an example, probability 1 that SR 120 and SR 121 in request pair 1 use the same solution may be determined based on semantic correlation 1. Probability 2 that SR 120 and SR 122 in request pair 2 use the same solution may be determined based on semantic correlation 2. Example implementations of block 206 and block 208 will be described with reference to FIG. 4 to FIG. 8.

At block 210, a retrieved historical service request is determined based on the probability. As an example, if probability 1 is greater than probability 2, then it may be determined that SR 121 in request pair 1 is retrieved historical SR 140.

Therefore, method 200 provides an effective retrieval strategy, a better retrieval result is realized by means of two kinds of correlation, and since a batch of irrelevant historical SRs are removed by screening at the first time, the required computing overhead and time are reduced, and the retrieval efficiency is improved.

In some embodiments, a corresponding solution index may be determined based on the retrieved historical service request. A searching request for the index is sent to the knowledge base, wherein the knowledge base stores a plurality of solutions for a plurality of service requests that have been solved. In response to receiving a response to the searching request, the response is determined as the solution for the service request. As an example, if the index of the solution corresponding to the retrieved historical SR is S111, then content of S111 may be retrieved in the knowledge base as the response to be provided to computing device 110. It can be understood that such an automatic recommendation process can improve the efficiency and experience of engineers.

Figure 3:
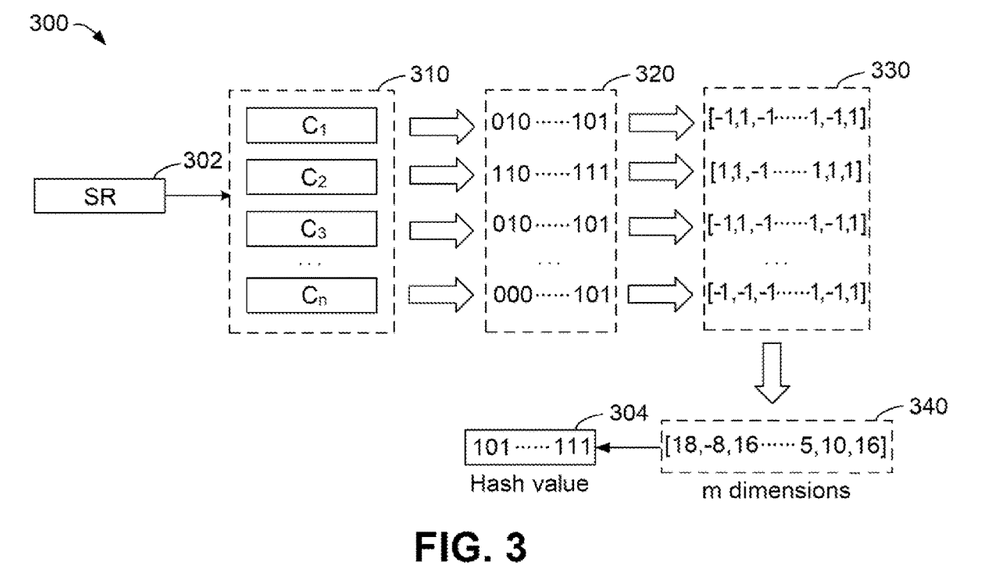
FIG. 3 shows a schematic diagram of a process for determining a hash value according to an example implementation of the present disclosure.

FIG. 3 shows a schematic diagram of process 300 for determining a hash value according to an example implementation of the present disclosure. The step of block 202 in FIG. 2 may be implemented with reference to FIG. 3. As shown in FIG. 3, the similarity between two SRs may be estimated quickly by utilizing a hash process. Specifically, the process of calculating a hash value of a SR is as follows: At block 310, a hash value of each chunk of any SR 302 is calculated, such as C1, C2, C3 to Cn. One of the chunks may be a word or a sub character string of SR 302. In some embodiments, MD5 may be selected as a hash function, and such hash value is 64-bit binary code.

At block 320, for each binary hash value, the hash value may be decomposed into a vector, and a 64-dimensional vector may be obtained by transforming the 0 bit to −1 and keeping the 1 bit unchanged. At block 330, all vectors obtained at step 2 may be summed, and a 0-1 vector may be obtained by calling a sign function, also referred to as an "sgn" function, for each component. At block 340, all components of the 0-1 vector may be connected to finally obtain hash value 304 of one SR 302.

In some embodiments, a distance (e.g., Hamming distance) between the hash values of two SRs may be used for evaluating the correlation between the two SRs. Therefore, some relatively relevant historical SRs may be obtained through preliminary screening for subsequent processing without increasing the computing overhead too much.

In some embodiments, SR 120 and the preliminarily similar historical SRs obtained by screening may be paired in a one-to-one manner to form SR pairs. Each SR pair includes SR 120 and one historical SR obtained by screening.

Illustrative embodiments of the present disclosure provide similarity learning techniques, configured to learn from a similarity function, where the similarity function measures the similarity or correlation between two objects. In some embodiments, similarity learning may be defined as: a given similar object pair $(x_i, x_i^+)$ and non-similar objects $(x_i, x_i^-)$. An equivalent formula is that each $(x_i^1, x_i^2)$ pair is given together with one binary label $y_i \in (0,1)$, and the label is used for determining whether two objects are similar.

Some embodiments of the present disclosure then learn a classifier (referring to FIG. 4), where the classifier may decide whether a new object pair is similar. In the present disclosure, $(x_i^1, x_i^2)$ is an SR pair within a Hamming distance threshold value of the hash value, and $y_i \in (0, 1)$ is labeled as to whether the same solution is used.

Figure 4:
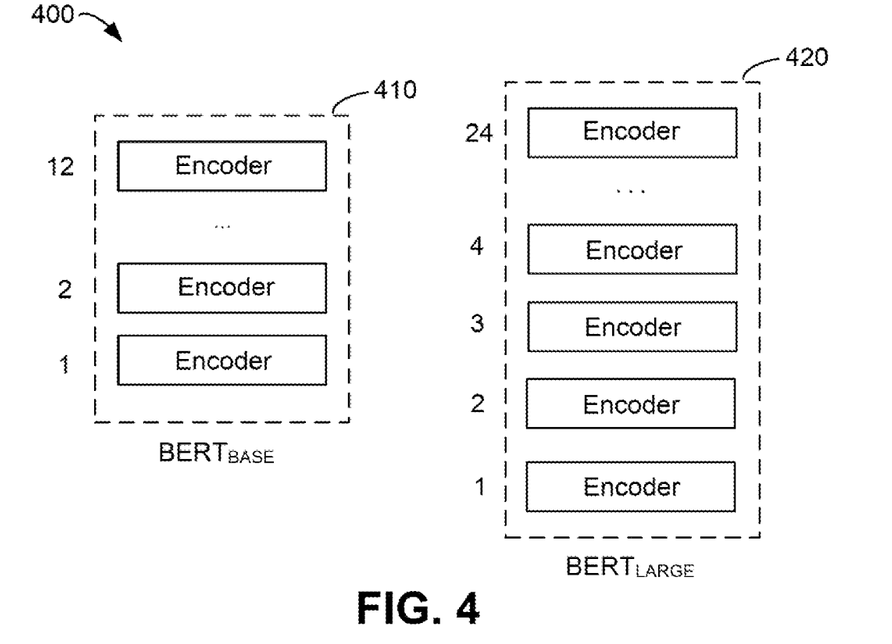
FIG. 4 shows a block diagram of a model for determining a semantic correlation according to an example implementation of the present disclosure.

FIG. 4 shows a block diagram of model 400 for determining a semantic correlation according to an example implementation of the present disclosure. The steps of block 206 and block 208 in FIG. 2 may be implemented with reference to FIG. 4. On the whole, model 400 is the classifier, as described above, obtained via improvement and pre-training on the basis of a BERT model architecture. In some embodiments, model 400 is included in SRSM 130.

Model 400 creatively implements applying bidirectional training of an attention mechanism to language modeling, and fine-tuning a language model to a particular task. An encoder of model 400 has an attention mechanism for learning a context relation between words in text. Model 400 is composed of a plurality of stacked encoders. The number of stacked encoders determines the number of parameters of model 400. Since the encoder reads an entire word sequence, it is considered bidirectional. Such a feature allows model 400 to learn the context of a word according to all its surroundings (the left side and the right side of the word).

In some embodiments, model 400 includes BERT$_{BASE}$ sub-model 410 and BERTLARGE sub-model 420. Taking sub-model 410 as an example, the sub-model includes a stack composed of 12 encoders. Taking sub-model 420 as an example, the sub-model includes a stack composed of 24 encoders. It can be understood that more and more-fine-grained semantic features can be extracted in a stack having more layers, however, the computing overhead and consumed time will be increased, so that a balanced scheme is required.

Figure 5:
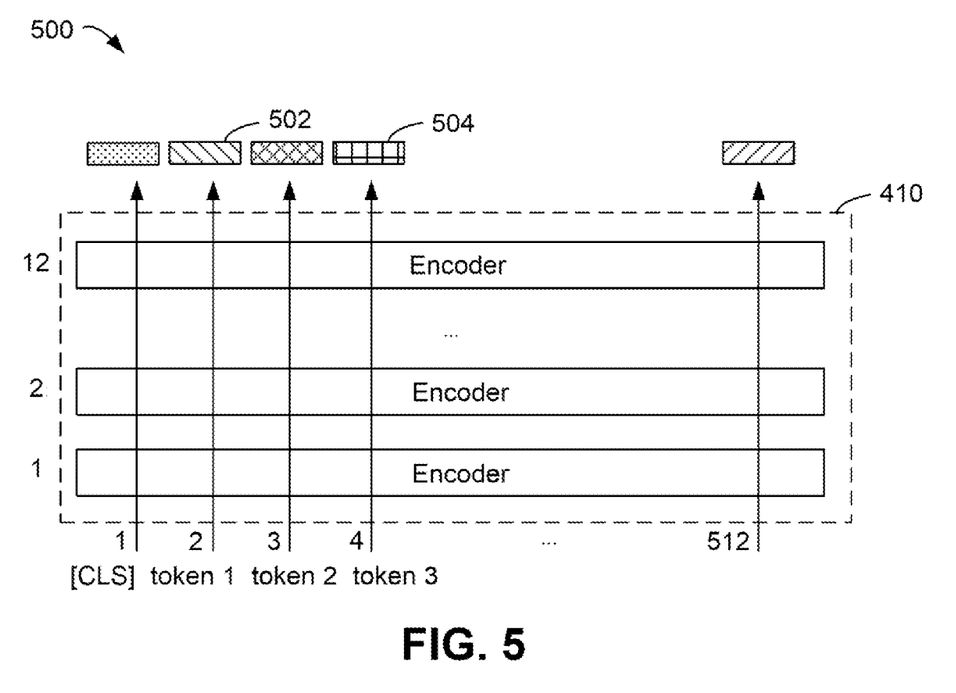
FIG. 5 shows a schematic diagram of an input and an output of a model for determining a semantic correlation according to an example implementation of the present disclosure.

FIG. 5 shows a schematic diagram of input and output 500 of a model for determining a semantic correlation according to an example implementation of the present disclosure. In FIG. 5, it can be seen that in model 400, the input is a sequence of tokens, and these tokens are embedded into a vector first and then processed in the stacked encoders. The output is a sequence of vectors of size H, such as vector 502 and vector 504, in which each vector corresponds to an input label with the same index. Each input text starts with [CLS], and sentences are separated by [SEP].

From the perspective of an application, when a text classifier model is constructed by using model 400, model 400 should be pre-trained first with a relevant large-scale corpus in a semi-supervised manner. Then, instances of labels are fed to model 400 for fine-tuning of the model.

Figure 6:
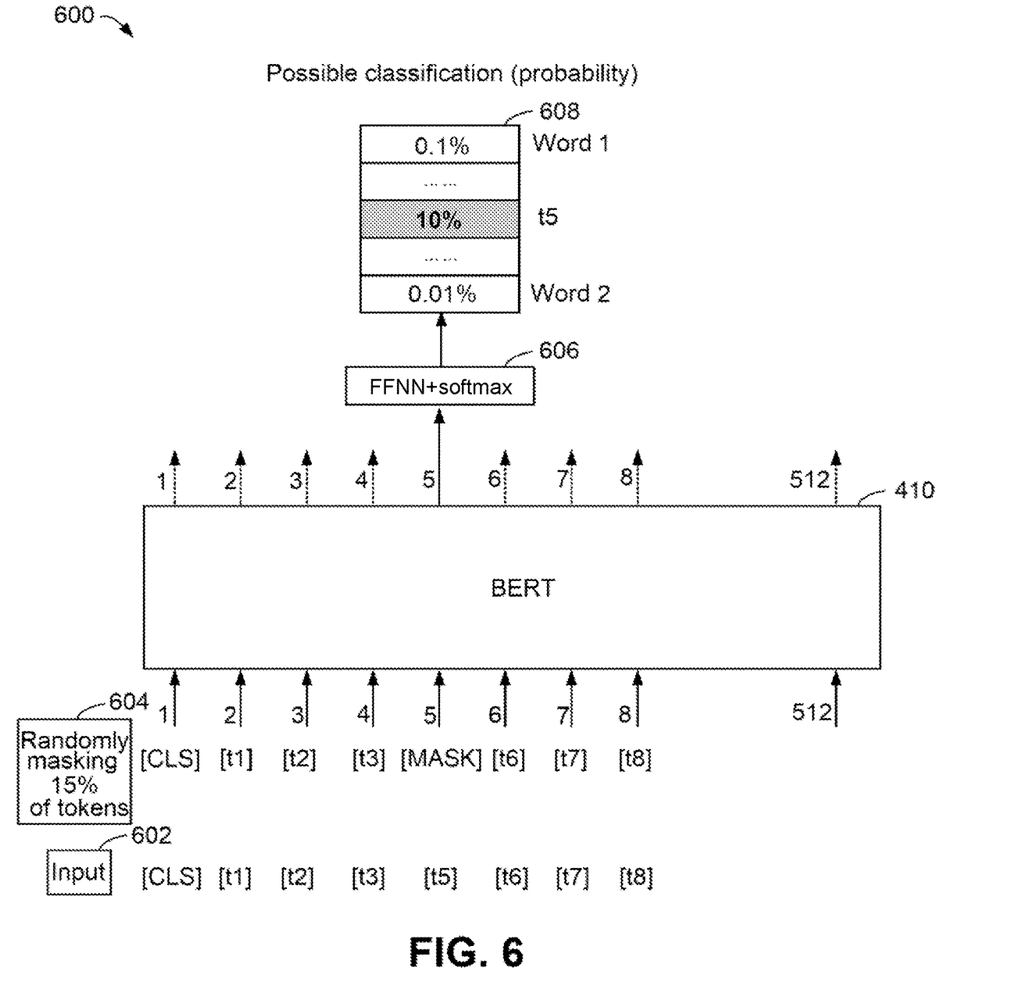
FIG. 6 shows a schematic diagram of pre-training of a model for determining a semantic correlation according to an example implementation of the present disclosure.
Figure 7:
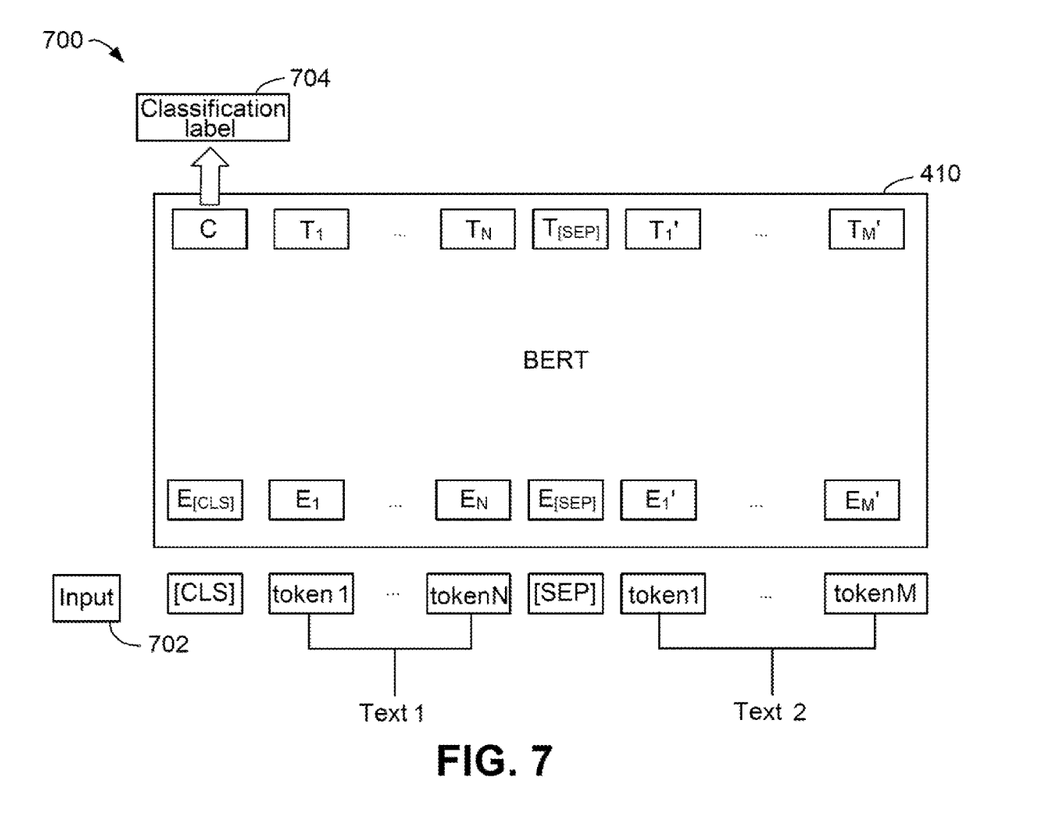
FIG. 7 shows a schematic diagram of a fine-tuning process of a model for determining a semantic correlation according to an example implementation of the present disclosure.

FIG. 6 shows a schematic diagram of pre-training 600 of a model for determining a semantic correlation according to an example implementation of the present disclosure. FIG. 7 shows a schematic diagram of fine-tuning process 700 of a model for determining a semantic correlation according to an example implementation of the present disclosure. The training and fine-tuning processes of sub-model 410 are described below in combination with FIG. 6 and FIG. 7. Those for sub-model 420 are similar.

In some embodiments, in a pre-training phase, a masked language model (MLM) and a next sentence prediction (NSP) task are trained together, in order to minimize a combined loss function of these two strategies.

For the MLM, at block 602, a sentence is to be input, where the sentence has 8 tokens, t1 to t8 respectively. At block 604, before a word sequence is input to model 400, 15% of words in each sequence are replaced with a [MASK] label (for example, t5 is replaced). Then, sub-model 410 attempts to predict an original value of a masked word according to context provided by other non-masked words in the sequence. Prediction of output words requires the following operations, that is, at block 608:

(1) a classification layer (as an example, a forward feedback neural network (FFNN)) is added onto outputs of the encoders.
(2) an output vector is multiplied by an embedded matrix to be converted into a vocabulary dimension.
(3) a probability of each word in the glossary is calculated with softmax.

In some embodiments, a predicted probability of t5 is 10%, a predicted probability of word 1 is 0.1%, a predicted probability of word 2 is 0.01%, and thus the probability of t5 in the whole glossary is the highest, so t5 may be used as an output result.

For the NSP task, at block 702, in the training process of sub-model 410, sub-model 410 may be made to receive paired sentences (e.g., text 1 and text 2) as an input. In some embodiments, text 1 may be acquired SR 120, and text 2 may be the plurality of historical SRs. Text 1 is converted into a semantic representation (also referred to as first semantic representation) thereof. Text 2 is converted into a semantic representation (also referred to as second semantic representation) thereof. Sub-model 410 needs to learn to predict whether the second sentence in the pair is a subsequent sentence in an original document.

In the fine-tuning phase of sub-model 410, the similarity modeling task recommends an SR solved with the same knowledge base, which completes a task similar to a next sentence classifying task, that is, at block 704, a classification label is output. As shown in FIG. 7, it may be realized by adding a binary classification layer onto the [CLS]-labeled output of sub-model 410.

Figure 8:
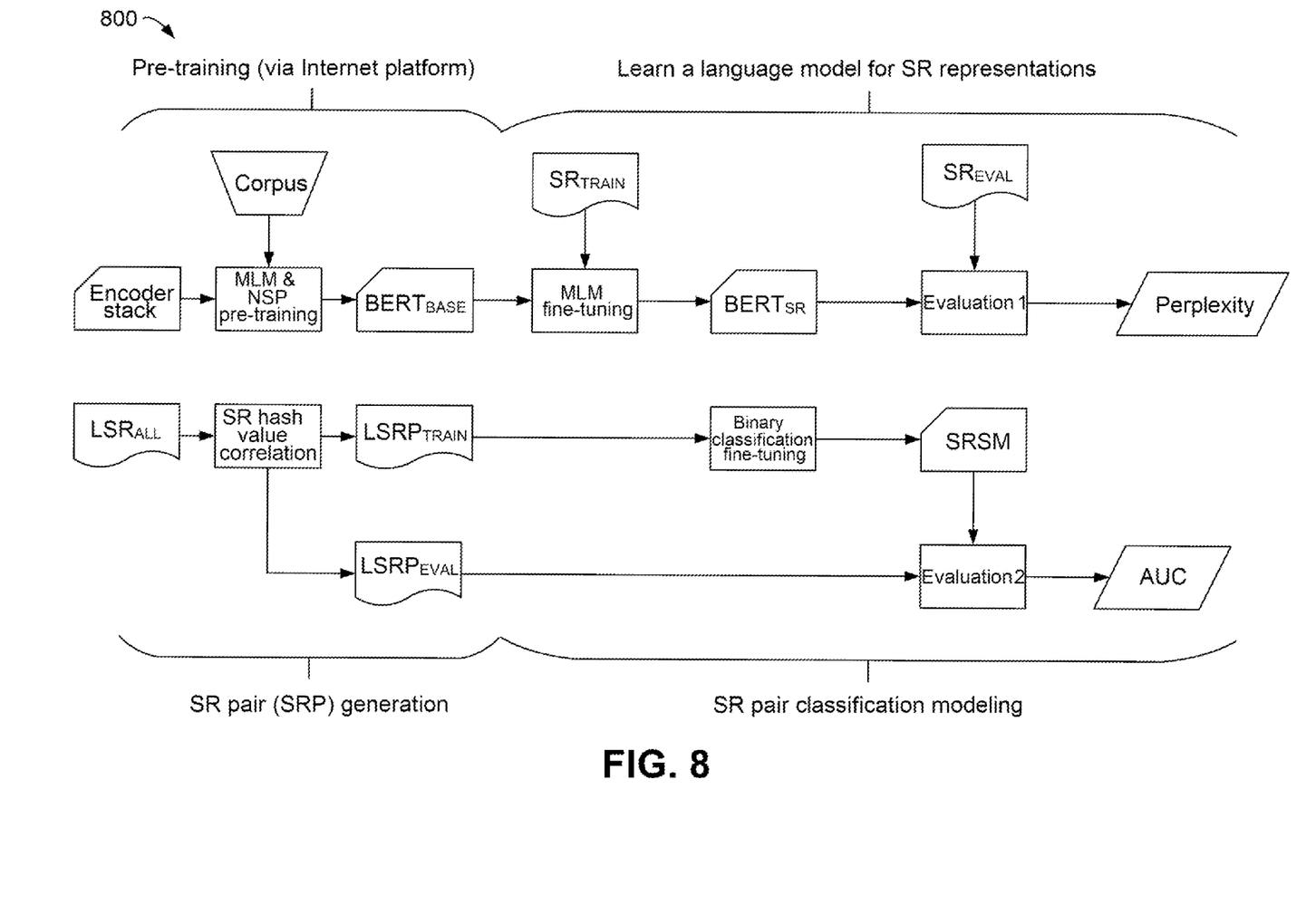
FIG. 8 shows a schematic diagram of a process for recommending a solution based on a retrieved historical service request according to an example implementation of the present disclosure.

FIG. 8 shows a schematic diagram of process 800 for recommending a solution based on a retrieved historical service request according to an example implementation of the present disclosure. In the present disclosure, some embodiments provide a process to find a similar solved case by using a machine learning technology and promote customer service request classification. To achieve this, the present disclosure concentrates on constructing a retrieval strategy that can be solved, and recommending a corresponding solution based on a retrieval result.

As shown in FIG. 8, some embodiments of the present disclosure recommend a similar solved service request by means of a retrieval strategy implemented by two-step similarity modeling. Some modules and definitions in FIG. 8 will be introduced in the following description.

In the retrieval strategy provided by illustrative embodiments of the present disclosure, two indicators are introduced:

Indicator 1: correlation of hash values, which may be worked out from the SR in the service request pair (SRP).

Indicator 2: probability that the SR in the SRP may be solved with the same solution. This indicator may be learned from historical request pairs. In some embodiments, indicator 2 may be defined as an output of the SRSM.

In some embodiments, an SR that is solved similarly may be quickly filtered by means of indicator 1, and a plurality of SRPs may be constructed. A language model based on model 400 is trained as a feature representation of the SR, and model 400 is fine-tuned on the labeled SR pair. A learned SR pair classifier is used as indicator 2 to predict a probability (also referred to as first probability) that the SR in the SR pair may be solved with the same solution.

An example implementation of SRSM 130 is specifically introduced below. In some embodiments, data preparation may be completed first, that is, data is trained. In some embodiments, a log file may be collected from a customer service system, and the title and description are filled in by a customer and submitted as an SR to describe a problem. An engineer closing the SR case may add a solution to a corresponding knowledge base (KB). As an example, sample data may include a plurality of SRs. Each SR illustratively has the following fields: a serial number, a title, and a description of the SR and a serial number in the KB. The title of the SR embodies a brief description of the SR, usually in one sentence. The description of the SR embodies specific content of the SR, usually in one or more paragraphs. Each SR may correspond to one serial number in the KB, and the serial number in the KB indicates which solution the SR is solved by, thus may be understood as an index. In the present disclosure, a data set containing all SRs is defined as $SR_{ALL}$, and a data set containing all labeled SRs is defined as $LSR_{ALL}$.

In some embodiments, the title and the description are connected into a whole SR, and the SR is used as an input feature. All words in the title and the description are converted into lower cases, and punctuations are deleted. The entire log data set may be divided into a training data set and an evaluation data set based on the creation time stamps of the SRs. Correspondingly, $SR_{ALL}$ is further divided into $SR_{TRAIN}$ and $SR_{EVAL}$, and $LSR_{ALL}$ is further divided into $LSR_{TRAIN}$ and $LSR_{EVAL}$. $SR_{TRAIN}$ is used as a training corpus to train a language model. The language model is evaluated on $SR_{EVAL}$ by means of perplexity (used for measuring the quality of a probability distribution or probability model prediction sample). All SRs labeled by the KB ($LSR_{ALL}$) are used for constructing the SR pairs, and each SR is compared with an SR that is solved previously. In each request pair, indicator 1 is used for filtering out irrelevant SR pairs. In addition, each request pair is labeled with whether the SR is solved with the same solution. Finally, referring to Table 1, a labeled service request pair ($LSRP_{ALL}$) may be obtained, and indicator 1 of the SR in the request pair is further calculated. $LSRP_{ALL}$ is divided into $LSRP_{TRAIN}$ and $LSRP_{EVAL}$ according to SR1. If SR1 is within $LSR_{TRAIN}$, the request pair should be within $LSRP_{TRAIN}$, and if SR1 is within $LSR_{EVAL}$, the request pair should be within $LSRP_{EVAL}$.

TABLE 1

| Label | SR1 | SR2 | Correlation |
|---|---|---|---|
| 0 | Specific content 1 | Specific content 2 | 10 |
| ... | ... | ... | ... |
| 1 | Specific content 3 | Specific content 4 | 7 |
| 1 | Specific content 5 | Specific content 6 | 10 |

In some embodiments, statistical data of the above data sets is shown in Table 2. It can be seen that in the training data set and the evaluation data set, the number of the SR pairs is quite large, and thus a better retrieval result needs to be further screened to save time and improve the retrieval quality.

TABLE 2

| Training | Evaluation | Total |
|---|---|---|
| $SR_{TRAIN}$ (330000) | $SR_{EVAL}$ (122825) | $SR_{ALL}$ (452825) |
| $LSR_{TRAIN}$ (162892) | $LSR_{EVAL}$ (71484) | $LSR_{ALL}$ (234376) |
| $LSRP_{TRAIN}$ (3002349) | $LSRP_{EVAL}$ (3451643) | $LSRP_{ALL}$ (6453992) |

In some embodiments, similar SRs may be removed by screening by means of the correlation of hash values. For example, 27,465,937,500 possible SR pairs may be obtained from $LSR_{ALL}$, but it is impossible to process so many instances, so that irrelevant SR pairs are filtered out by using indicator 1. In some embodiments, the threshold value is made to be >3 to avoid paired repeated submitting of SRs. Referring to Table 3, it can be found that if the threshold value is less than 10, the coverage is significantly lowered, but the proportion of SR pairs having the same solution from the KB is almost not increased. If the threshold value is increased to 15, although a high coverage may be achieved by increasing the number of the SR pairs, the proportion of SR pairs having the same solution will be reduced, so the distance threshold value is set to be 10 to balance the effect, coverage, and efficiency. It can be understood that the above threshold value may be changed for different SR data sets, and the present disclosure does not limit the setting of the threshold value.

TABLE 3

| Hash correlation (>=3) | Number of SR pairs | Number of SR pairs using the same solution | Number of SRs covered by request pairs | Number covered by SRs using the same solution |
|---|---|---|---|---|
| <=15 | 43,554,172 | 19,129,677 (43.92%) | 62,717 (87.73%) | 50,121 (70.11%) |
| <=10 | 3,451,643 | 2,280,024 (66.06%) | 42,660 (59.67%) | 35,802 (50.08%) |

TABLE 3-continued

| Hash correlation (>=3) | Number of SR pairs | Number of SR pairs using the same solution | Number of SRs covered by request pairs | Number covered by SRs using the same solution |
|---|---|---|---|---|
| <=8 | 970,533 | 677,543 (69.81%) | 33,710 (47.15%) | 27,851 (38.96%) |
| <=5 | 99,912 | 70,559 (70.62%) | 15,195 (21.26%) | 12,062 (16.87%) |

In some embodiments, model selection can be performed and an MLM can be constructed to learn the feature representations of the SRs. Several model architectures pre-trained on different corpora are provided on the Internet. Due to limited GPU resources, an architecture composed of 12 stacked encoders may be selected. As an example, pre-training may be performed by using Wiki encyclopedia and book corpora.

In some embodiments, a language style in a corpus has a great difference from that of Wiki encyclopedia and book corpora which were originally used for pre-training, but it is still too small for training model 400 or SRSM 130 from the beginning. Therefore, in some embodiments, a fine-tuned $BERT_{BASE}$ model may be applied on our corpus of equivalent technologies ($SR_{TRAIN}$) through the MLM to obtain a new language model $BERT_{SR}$. In some embodiments, $BERT_{BASE}$ and $BERT_{SR}$ may be evaluated on $SR_{EVAL}$ by using perplexity. Results are shown in Table 4. Compared with $BERT_{BASE}$, $BERT_{SR}$ can significantly lower perplexity.

TABLE 4

| Corpus | Data size | Perplexity |
|---|---|---|
| Wiki + Book corpora | 16 G | 58.3553 |
| $SR_{TRAIN}$ | 94 MB | 5.2453 |

In some embodiments, a supervised classifier may be constructed based on the feature representation learned by the language model. $BERT_{SR}$ is fine-tuned on $LSRP_{TRAIN}$, and the method is to add a classification (logic loss) layer onto an output of a [CLS] token. The SRs in each SR pair are separated by [SEP] and fed to $BERT_{SR}$ as an input feature. A label being 0 or 1 represents whether the SRs in the SR pair may use the same solution. As an example, fine-tuning of 3 epochs may be performed on $LSRP_{TRAIN}$, with the batch size of each GPU being 128. In this way, trained SRSM 130 may be obtained to measure the probability that the SRs in the SR pair may be solved with the same solution.

It can be seen that SRSM 130 is evaluated on $LSRP_{EVAL}$ and compared with indicator 1, and its improvement is significant. The result of purely using hash correlation is poor, this conclusion is consistent with statistical data in Table 3, because most irrelevant SR pairs have been deleted according to indicator 1, and indicator 1 shows that the sorting capability of the remaining pairs is poor. However, SRSM 130 shows very high sorting capability through pre-training and supervised learning, and as shown in Table 5, the effect of SRSM 130 is better than the effect of using indicator 1 only. Therefore, indicator 1 and indicator 2 need to be used comprehensively, i.e., SRSM 130.

TABLE 5

| Model | AUC |
|---|---|
| SRSM | 0.7421 |
| Indicator 1 | 0.5330 |

AUC represents an area defined by an ROC (receiver operating characteristic) curve and coordinate axes, and the larger the AUC, the better the effect.

In some embodiments, similar cases may be retrieved for a newly submitted SR. For the newly submitted SR, irrelevant solved SRs have been filtered out by indicator 1, and then an output of SRSM 130 is used as indicator 2 to score the remaining SR pairs. A limited number of SRs that have been solved historically are recommended.

In some embodiments, based on the determined semantic correlation of each request pair, a second probability indicating that the service request and the historical service request in the request pair use similar solutions is determined. The retrieved historical service request may be determined based on the first probability and the second probability. As an example, if historical SR 121 has a solution similar to that of SR 120, the solution may also be used as the recommended solution.

In embodiments of the present disclosure, the service request classification problem is expressed as a similarity learning problem, and a retrieval strategy solves the similarity problem by means of two-step similarity modeling having two indicators. Indicator 1 is efficient and may be directly worked out from text, and thus indicator 1 may quickly filter out irrelevant SRs. Indicator 2 is the output of the SRSM, and is obtained by pre-training the language model and fine-tuning historical label pairs. Therefore, it can be understood that indicator 1 is used as a coarse-grained heuristic rule to eliminate irrelevant conditions, while indicator 2 may perform fine-grained ranking for the remaining conditions. SRs with similar scores from indicator 1 and indicator 2 may help support engineers to improve efficiency and accumulate experience. In some embodiments, after irrelevant request pairs are filtered out by means of indicator 1, the remaining request pairs share the same solution. Moreover, indicator 2 may give a fine-grained ranking of the remaining request pairs, and then screen to obtain the most appropriate retrieval result.

Figure 9:
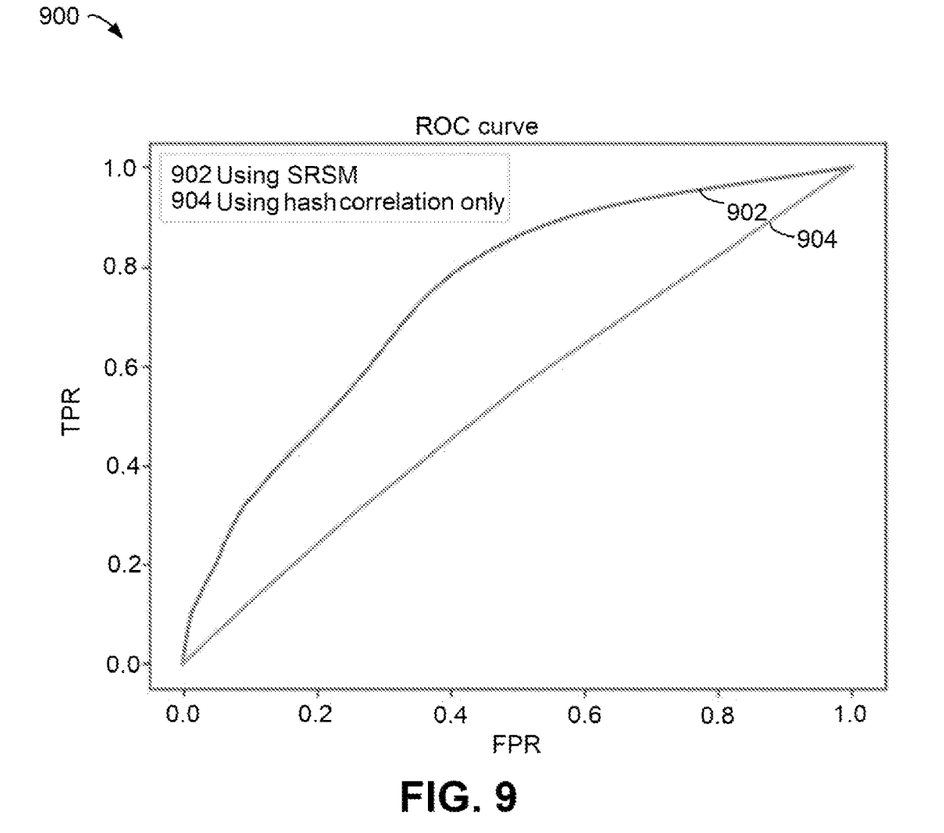
FIG. 9 shows a schematic diagram of comparison of retrieval results according to an example implementation of the present disclosure.

FIG. 9 shows a schematic diagram of comparison 900 of retrieval results according to an example implementation of the present disclosure. It can be seen that comparison 900 shows an ROC curve. Curve 902 shows an ROC curve obtained by using the SRSM, and curve 904 shows an ROC curve obtained by using indicator 1 (i.e., hash correlation) only. It can be seen from the figure that a ratio of a true positive rate TPR to a false positive rate FPR of curve 902 is large, and thus the effect is good.

Figure 10:
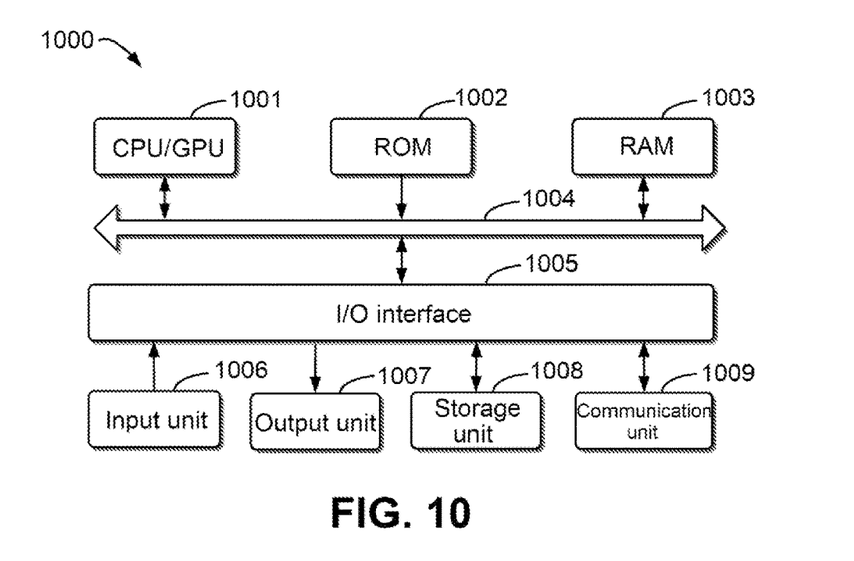
FIG. 10 shows a block diagram of a device for retrieving service requests according to an example implementation of the present disclosure.

FIG. 10 shows a schematic block diagram of device 1000 that may be used to implement embodiments of the present disclosure. Device 1000 may be a device or apparatus as described in embodiments of the present disclosure. As shown in FIG. 10, device 1000 includes central processing unit and/or graphics processing unit (CPU/GPU) 1001 that may perform various appropriate actions and processing according to computer program instructions stored in read-only memory (ROM) 1002 or computer program instructions loaded from storage unit 1008 into random access memory (RAM) 1003. Various programs and data needed for the operation of device 1000 may also be stored in RAM 1003. CPU/GPU 1001, ROM 1002, and RAM 1003 are connected to one other through bus 1004. Input/output (I/O) interface 1005 is also connected to bus 1004. Although not shown in FIG. 10, device 1000 may also include a co-processor.

A plurality of components in device 1000 are connected to I/O interface 1005, including: input unit 1006, such as a keyboard and a mouse; output unit 1007, such as various types of displays and speakers; storage unit 1008, such as a magnetic disk and an optical disc; and communication unit 1009, such as a network card, a modem, and a wireless communication transceiver. Communication unit 1009 allows device 1000 to exchange information/data with other devices via a computer network, such as the Internet, and/or various telecommunication networks.

The various methods or processes described above may be performed by CPU/GPU 1001. For example, in some embodiments, the method may be implemented as a computer software program that is tangibly included in a machine-readable medium, such as storage unit 1008. In some embodiments, part or all of the computer program may be loaded and/or installed to device 1000 via ROM 1002 and/or communication unit 1009. When the computer program is loaded into RAM 1003 and executed by CPU/GPU 1001, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated improvements, so as to enable persons of ordinary skill in the art to understand the various embodiments disclosed herein.

What is claimed is:

1. A method for retrieving service requests, comprising:
   determining, based on an acquired service request, a hash value of the service request;
   determining a plurality of request pairs based on a plurality of correlations between the hash value of the service request and a plurality of hash values of a plurality of historical service requests, wherein each of the plurality of request pairs comprises the service request and one historical service request, utilizing a filtering operation based on a first indicator in a first stage of a multi-stage similarity modeling process;
   determining a semantic correlation between the service request and the one historical service request in each of the plurality of request pairs;
   determining, based on the determined semantic correlation of each request pair, a probability indicating that the service request and the historical service request in the request pair use the same solution, to provide a classification result as a second indicator in a second stage of the multi-stage similarity modeling process; and
   determining a retrieved historical service request based on the probability;
   wherein labels are associated with respective request pairs in conjunction with the multi-stage similarity modeling process, a given one of the labels having one of a first value to indicate that two requests in the corresponding pair use the same solution and a second value different than the first value to indicate that the two requests in the corresponding pair do not use the same solution;
   the classification result being generated by a machine learning model trained utilizing at least a portion of the labeled request pairs.

2. The method according to claim 1, further comprising:
   determining the corresponding solution as a solution of the service request based on the retrieved historical service request.

3. The method according to claim 2, wherein the service request represents a service request that is presented by a user and to be solved, the historical service request represents a service request that has been solved, and determining the corresponding solution as a solution of the service request based on the retrieved historical service request comprises:

determining a corresponding solution index based on the retrieved historical service request;

sending a searching request for the index to a knowledge base, wherein the knowledge base stores a plurality of solutions of a plurality of service requests that have been solved; and determining, in response to receiving a response to the searching request, the response as the solution of the service request.

4. The method according to claim 1, wherein the plurality of historical service requests are determined in the following manner:

determining, based on the acquired service request, a cluster to which the service request belongs;

determining, in the determined cluster, other service requests whose correlation with the service request meets a threshold value; and determining the other service requests as the plurality of historical service requests.

5. The method according to claim 4, wherein determining, in the determined cluster, other service requests whose correlation with the service request meets a threshold value comprises:

determining, based on the text of each service request, a hash value of a character string of the text in the determined cluster; and determining a hash value of each service request based on the hash value of the character string of the text.

6. The method according to claim 5, wherein determining, in the determined cluster, other service requests whose correlation with the service request meets a threshold value further comprises:

determining the historical service requests as historical service requests similar to the service request in response to that correlations between the hash value of the service request and the hash values of the historical service requests meet a threshold value.

7. The method according to claim 1, wherein determining, based on the determined semantic correlation of each request pair, a probability indicating that the service request and the historical service request in the request pair use the same solution comprises:

extracting, for each of the plurality of request pairs, a first semantic representation of each service request and a second semantic representation of the historical service request; and determining the probability based on a similarity between the first semantic representation and the second semantic representation.

8. The method according to claim 7, wherein the service request comprises a title and a description, and the extracting, for each of the plurality of request pairs, a first semantic representation of each service request and a second semantic representation of the historical service request comprises:

extracting syntax and semantic features of the title and description of the service request to determine the first semantic representation; and extracting syntax and semantic features of the title and description of the historical service request to determine the second semantic representation.

9. The method according to claim 1, wherein the probability is a first probability, and the method further comprises:

determining, based on the determined semantic correlation of each request pair, a second probability indicating that the service request and the historical service request in the request pair use similar solutions; and determining the retrieved historical service request based on the first probability and the second probability.

10. The method according to claim 1, wherein the method is executed at least in part by the trained machine learning model and further comprises:

training the machine learning model by utilizing sample data, wherein the sample data comprises service requests, historical service requests and correspondingly labeled clusters, labeled request pairs, and labeled solutions thereof.

11. An electronic device, comprising:

a processor; and a memory coupled to the processor, wherein the memory has instructions stored therein which, when executed by the processor, cause the electronic device to execute actions comprising:

determining, based on an acquired service request, a hash value of the service request;

determining a plurality of request pairs based on a plurality of correlations between the hash value of the service request and a plurality of hash values of a plurality of historical service requests, wherein each of the plurality of request pairs comprises the service request and one historical service request, utilizing a filtering operation based on a first indicator in a first stage of a multi-stage similarity modeling process;

determining a semantic correlation between the service request and the one historical service request in each of the plurality of request pairs;

determining, based on the determined semantic correlation of each request pair, a probability indicating that the service request and the historical service request in the request pair use the same solution, to provide a classification result as a second indicator in a second stage of the multi-stage similarity modeling process; and determining a retrieved historical service request based on the probability;

wherein labels are associated with respective request pairs in conjunction with the multi-stage similarity modeling process, a given one of the labels having one of a first value to indicate that two requests in the corresponding pair use the same solution and a second value different than the first value to indicate that the two requests in the corresponding pair do not use the same solution;

the classification result being generated by a machine learning model trained utilizing at least a portion of the labeled request pairs.

12. The electronic device according to claim 11, wherein the actions further comprise:

determining the corresponding solution as a solution of the service request based on the retrieved historical service request.

13. The electronic device according to claim 12, wherein the service request represents a service request that is presented by a user and to be solved, the historical service request represents a service request that has been solved, and determining the corresponding solution as a solution of the service request based on the retrieved historical service request comprises:

determining a corresponding solution index based on the retrieved historical service request;

sending a searching request for the index to a knowledge base, wherein the knowledge base stores a plurality of solutions of a plurality of service requests that have been solved; and determining, in response to receiving a response to the searching request, the response as the solution of the service request.

14. The electronic device according to claim 11, wherein the plurality of historical service requests are determined by the following actions:

determining, based on the acquired service request, a cluster to which the service request belongs;

determining, in the determined cluster, other service requests whose correlation with the service request meets a threshold value; and determining the other service requests as the plurality of historical service requests.

15. The electronic device according to claim 14, wherein determining, in the determined cluster, other service requests whose correlation with the service request meets a threshold value comprises:

determining, based on the text of each service request, a hash value of a character string of the text in the determined cluster; and determining a hash value of each service request based on the hash value of the character string of the text.

16. The electronic device according to claim 15, wherein determining, in the determined cluster, other service requests whose correlation with the service request meets a threshold value further comprises:

determining the historical service requests as historical service requests similar to the service request in response to that correlations between the hash value of the service request and the hash values of the historical service requests meet a threshold value.

17. The electronic device according to claim 11, wherein determining, based on the determined semantic correlation of each request pair, a probability indicating that the service request and the historical service request in the request pair use the same solution comprises:

extracting, for each of the plurality of request pairs, a first semantic representation of each service request and a second semantic representation of the historical service request; and determining the probability based on a similarity between the first semantic representation and the second semantic representation.

18. The electronic device according to claim 17, wherein the service request comprises a title and a description, and the extracting, for each of the plurality of request pairs, a first semantic representation of each service request and a second semantic representation of the historical service request comprises:

extracting syntax and semantic features of the title and description of the service request to determine the first semantic representation; and extracting syntax and semantic features of the title and description of the historical service request to determine the second semantic representation.

19. The electronic device according to claim 11, wherein the probability is a first probability, and the actions further comprise:

determining, based on the determined semantic correlation of each request pair, a second probability indicating that the service request and the historical service request in the request pair use similar solutions; and determining the retrieved historical service request based on the first probability and the second probability.

20. A computer program product tangibly stored on a non-transitory computer-readable medium and comprising computer-executable instructions that, when executed by a device, cause the device to execute a method for retrieving service requests, the method comprising:

determining, based on an acquired service request, a hash value of the service request;

determining a plurality of request pairs based on a plurality of correlations between the hash value of the service request and a plurality of hash values of a plurality of historical service requests, wherein each of the plurality of request pairs comprises the service request and one historical service request, utilizing a filtering operation based on a first indicator in a first stage of a multi-stage similarity modeling process;

determining a semantic correlation between the service request and the one historical service request in each of the plurality of request pairs;

determining, based on the determined semantic correlation of each request pair, a probability indicating that the service request and the historical service request in the request pair use the same solution, to provide a classification result as a second indicator in a second stage of the multi-stage similarity modeling process; and determining a retrieved historical service request based on the probability;

wherein labels are associated with respective request pairs in conjunction with the multi-stage similarity modeling process, a given one of the labels having one of a first value to indicate that two requests in the corresponding pair use the same solution and a second value different than the first value to indicate that the two requests in the corresponding pair do not use the same solution;

the classification result being generated by a machine learning model trained utilizing at least a portion of the labeled request pairs.

* * * * *